United States Patent
Takeuchi et al.

(10) Patent No.: US 11,496,304 B2
(45) Date of Patent: Nov. 8, 2022

(54) INFORMATION PROCESSING DEVICE, INFORMATION PROCESSING METHOD, AND STORAGE MEDIUM

(71) Applicant: FUJITSU LIMITED, Kawasaki (JP)

(72) Inventors: Takuma Takeuchi, Kawasaki (JP); Ken Kamakura, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 17/108,697

(22) Filed: Dec. 1, 2020

(65) Prior Publication Data

US 2021/0234686 A1 Jul. 29, 2021

(30) Foreign Application Priority Data

Jan. 27, 2020 (JP) .............................. JP2020-010593

(51) Int. Cl.
| | | |
|---|---|---|
| *H04L 9/30* | (2006.01) | |
| *G06F 11/20* | (2006.01) | |
| *G06F 12/14* | (2006.01) | |
| *G06F 21/79* | (2013.01) | |
| *H04L 9/00* | (2022.01) | |

(52) U.S. Cl.
CPC .............. *H04L 9/30* (2013.01); *G06F 21/79* (2013.01); *H04L 9/50* (2022.05)

(58) Field of Classification Search
CPC ........ H04L 9/30; H04L 2209/38; G06F 21/79
See application file for complete search history.

(56) References Cited

U.S. PATENT DOCUMENTS

| | | | | |
|---|---|---|---|---|
| 6,373,948 | B1* | 4/2002 | Wool | H04N 21/4623 380/239 |
| 8,191,162 | B1* | 5/2012 | Shukla | G06F 21/6227 726/28 |
| 2008/0008319 | A1* | 1/2008 | Poirier | H04L 9/0891 348/E7.056 |
| 2014/0032929 | A1* | 1/2014 | Chen, I | G06F 21/78 713/189 |
| 2014/0289516 | A1* | 9/2014 | Sahay | H04L 63/0823 713/173 |
| 2016/0078431 | A1* | 3/2016 | Ramachandran | G06Q 20/3823 705/64 |
| 2017/0337552 | A1 | 11/2017 | Mandal et al. | |

(Continued)

FOREIGN PATENT DOCUMENTS

| | | | | |
|---|---|---|---|---|
| EP | 3644574 | B1 * | 8/2021 | ......... G06F 16/2246 |
| JP | 2017-204704 | A | 11/2017 | |

(Continued)

*Primary Examiner* — Darshan I Dhruv
(74) *Attorney, Agent, or Firm* — Fujitsu Patent Center

(57) ABSTRACT

An information processing device includes a memory; and a processor coupled to the memory and configured to transmit, to a terminal, a program and a first identifier related to the program, the program being encrypted with a first public key corresponding to a first private key of the terminal, the first identifier being encrypted by using the first public key and a second public key not corresponding to the first private key; and when the terminal receives the first identifier decrypted by the first public key and encrypted by the second public key, register, in a blockchain, transaction information which includes the first identifier decrypted with the second private key corresponding to the second public key.

6 Claims, 11 Drawing Sheets

(56) References Cited

U.S. PATENT DOCUMENTS

| | | | | |
|---|---|---|---|---|
| 2018/0123804 A1* | 5/2018 | Smith | ................ | H04L 63/0869 |
| 2019/0273607 A1* | 9/2019 | Van der Velden | ...... | H04L 9/088 |
| 2020/0084027 A1* | 3/2020 | Duchon | ................ | H04L 9/0861 |
| 2020/0160466 A1 | 5/2020 | Hori | | |
| 2020/0344062 A1* | 10/2020 | Haidar | .................. | G06F 21/604 |
| 2020/0389317 A1* | 12/2020 | Dunjic | .................... | H04L 67/00 |
| 2021/0126785 A1* | 4/2021 | Liu | ........................ | H04L 63/126 |
| 2021/0182773 A1* | 6/2021 | Padmanabhan | ....... | H04L 9/3239 |

FOREIGN PATENT DOCUMENTS

| | | | | |
|---|---|---|---|---|
| JP | 2017-208085 A | 11/2017 | | |
| JP | 2018-117287 A | 7/2018 | | |
| JP | 2018-139068 A | 9/2018 | | |
| WO | WO-2007062501 A1 * | 6/2007 | .......... | H04L 9/0866 |
| WO | 2019/004118 A1 | 1/2019 | | |
| WO | WO-2020002366 A1 * | 1/2020 | ............. | G06F 21/10 |

\* cited by examiner

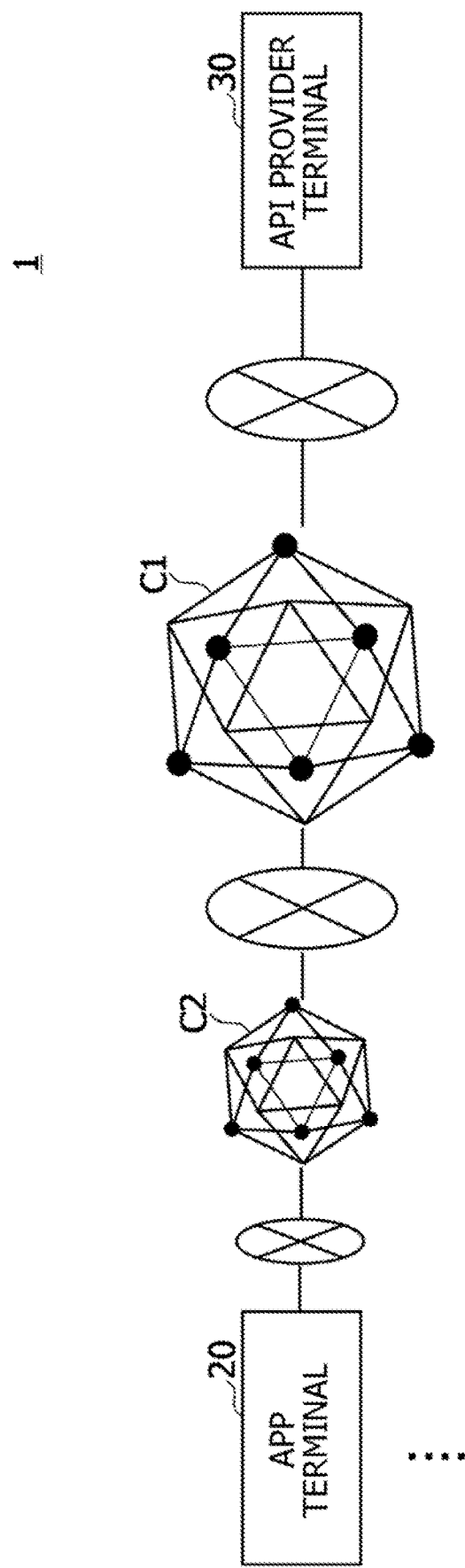

INFORMATION PROCESSING DEVICE, INFORMATION PROCESSING METHOD, AND STORAGE MEDIUM

CROSS-REFERENCE TO RELATED APPLICATION

This application is based upon and claims the benefit of priority of the prior Japanese Patent Application No. 2020-10593, filed on Jan. 27, 2020, the entire contents of which are incorporated herein by reference.

FIELD

The embodiments discussed herein are related to an information processing device, an information processing method and a storage medium.

BACKGROUND

In recent software development, it is rare for a single engineer to manage the whole program, and it is actively practiced to incorporate processing for calling the API library into the program by using an application program interface (API) library provided by a cloud service. The provider of such an API library makes a profit on a service of providing the API library by charging a user according to the number of times the user calls the API library.

On the other hand, for users of the service as described above, it is important to guarantee reproducibility of the processing for calling the API library. However, generally, the contents of processing of the API library are black-boxed from the outside. Thus, when specifications of the contents of processing are changed in the service, an execution result may change over time for the user even from the processing for calling the same API. Thus, for example, it is conceivable to guarantee the reproducibility on the premise of reliability such that the provider of the API library discloses the history of changes in program specifications without tampering.

For example, Japanese Laid-open Patent Publication No. 2018-117287, Japanese Laid-open Patent Publication No. 2017-204704, Japanese Laid-open Patent Publication No. 2017-208085, Japanese Laid-open Patent Publication No. 2018-139068, International Publication Pamphlet No. WO 2019/004118, and the like are disclosed as related art.

SUMMARY

According to an aspect of the embodiments, an information processing device comprising: a memory; and a processor coupled to the memory and configured to: transmit, to a terminal, a program and a first identifier related to the program, the program being encrypted with a first public key corresponding to a first private key of the terminal, the first identifier being encrypted by using the first public key and a second public key not corresponding to the first private key; and when the terminal receives the first identifier decrypted by the first public key and encrypted by the second public key, register, in a blockchain, transaction information which includes the first identifier decrypted with the second private key corresponding to the second public key.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating a configuration example of an information processing system according to a second embodiment.

DESCRIPTION OF EMBODIMENTS

Here, if a processing logic (program) of the API library is managed as data on a blockchain by using transparency of the blockchain and access control of the processing logic is performed using the blockchain, it is conceivably possible to assure reproducibility without requiring the reliability of the service provider.

However, once the processing logic as blockchain data is executed, the processing logic is shared by all nodes, and thus a user is able to use a similar processing logic without calling the API thereafter. Consequently, it becomes difficult for the API library provider to perform charging according to the number of times the program is executed.

In view of the above, it is desirable to enable charging according to the number of times the program is executed.

Figure 1:
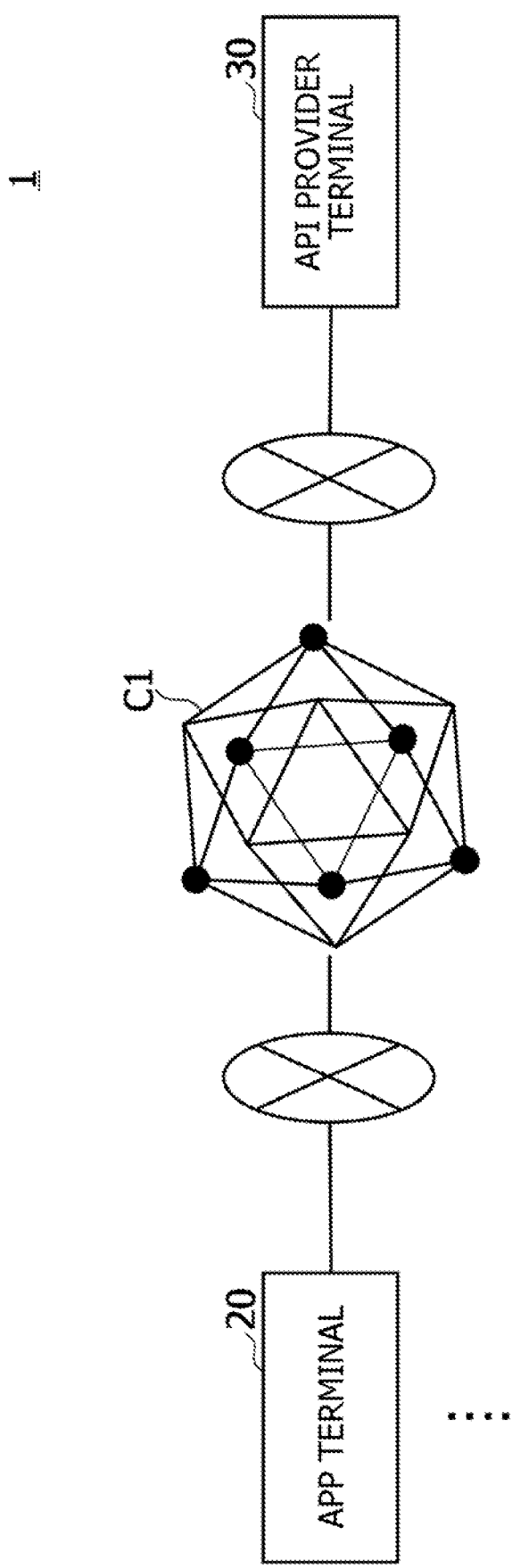
FIG. 1 is a diagram illustrating a configuration example of an information processing system according to a first embodiment.

A first embodiment will be described below based on the drawings. FIG. 1 is a diagram illustrating a configuration example of an information processing system according to the first embodiment.

In the information processing system 1 illustrated in FIG. 1, a blockchain C1 is connected to one or more app terminals 20 and one or more API provider terminals 30 via a network such as the Internet.

The app terminal 20 is a terminal in which an application program (hereinafter, referred to as "app a") that uses a program accessible via an application program interface (API) published in the blockchain C1 (hereinafter, referred to as "processing logic") is installed.

The API provider terminal 30 is a terminal used by a provider of the processing logic accessed via the API (hereinafter, referred to as "API provider") described above.

Note that a personal computer (PC), a smart phone, a tablet terminal, or the like may be used as the app terminal 20 and the API provider terminal 30.

The blockchain C1 is a blockchain that stores a processing logic.

Figure 2:
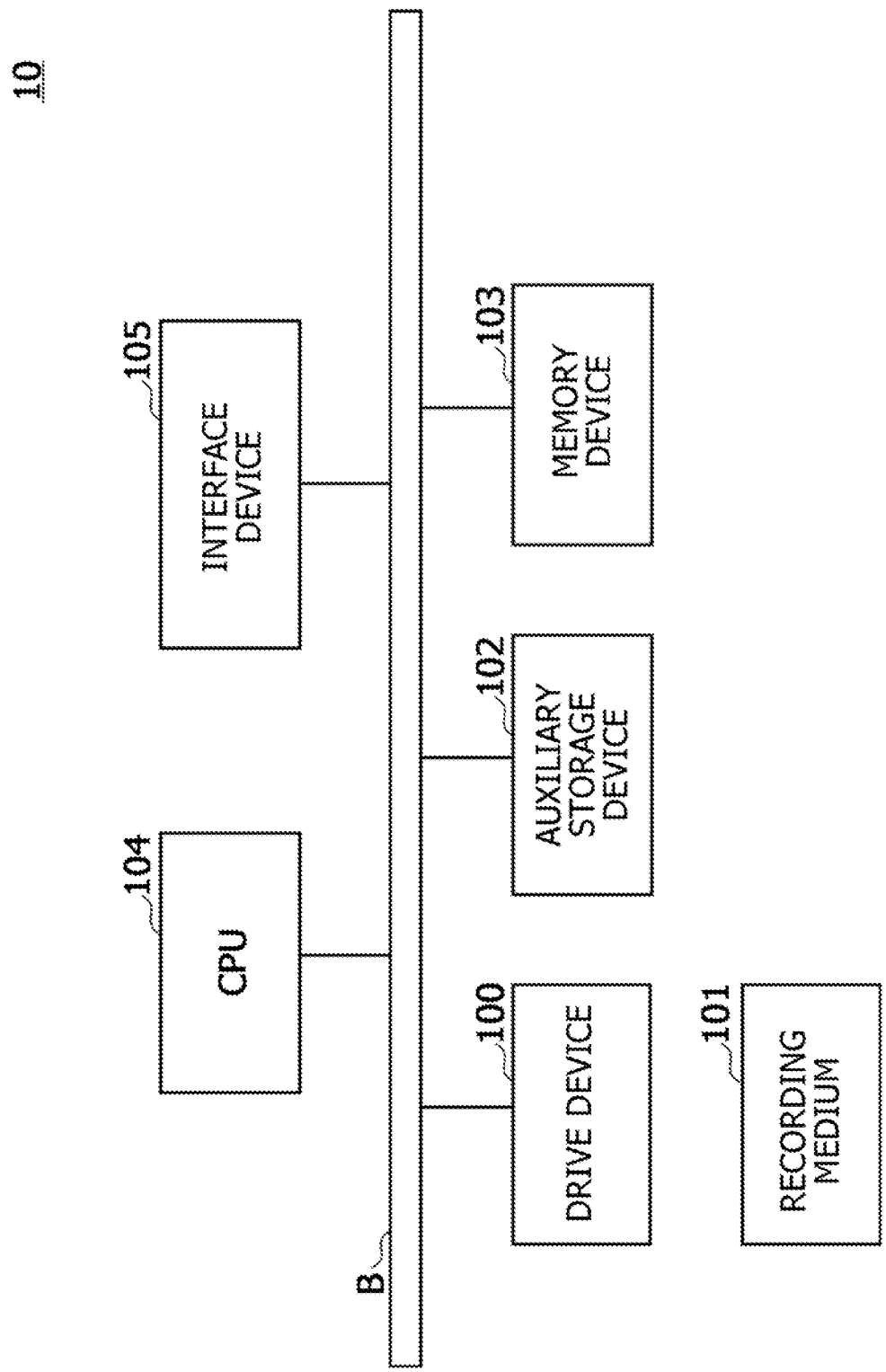
FIG. 2 is a diagram illustrating a hardware configuration example of each node 10 of a blockchain C1 in the first embodiment.

FIG. 2 is a diagram illustrating a hardware configuration example of each node 10 of the blockchain C1 in the first embodiment. As illustrated in FIG. 2, the node 10 has a drive device 100, an auxiliary storage device 102, a memory device 103, a CPU 104, an interface device 105, and the like, which are mutually connected by a bus B respectively.

A program that implements processing in the node 10 is provided by a recording medium 101. The recording medium 101 recording the program is set in the drive device 100, and then the program is installed in the auxiliary storage device 102 from the recording medium 101 via the drive device 100. However, the program does not have to be installed from the recording medium 101, and the program may be downloaded from another computer via the network. The auxiliary storage device 102 stores the installed program and also stores files, data, and the like that are needed.

The memory device 103 reads the program from the auxiliary storage device 102 and stores the program when an instruction to activate the program is given. The CPU 104 executes a function related to the node 10 according to the program stored in the memory device 103. The interface device 105 is used as an interface for connecting to the network.

Note that as an example of the recording medium 101, a portable recording medium such as a CD-ROM, a DVD disc, or a USB memory may be given. Further, as an example of the auxiliary storage device 102, a hard disk drive (HDD), a flash memory, or the like may be given. Both the recording medium 101 and the auxiliary storage device 102 correspond to a computer-readable recording medium.

Figure 3:
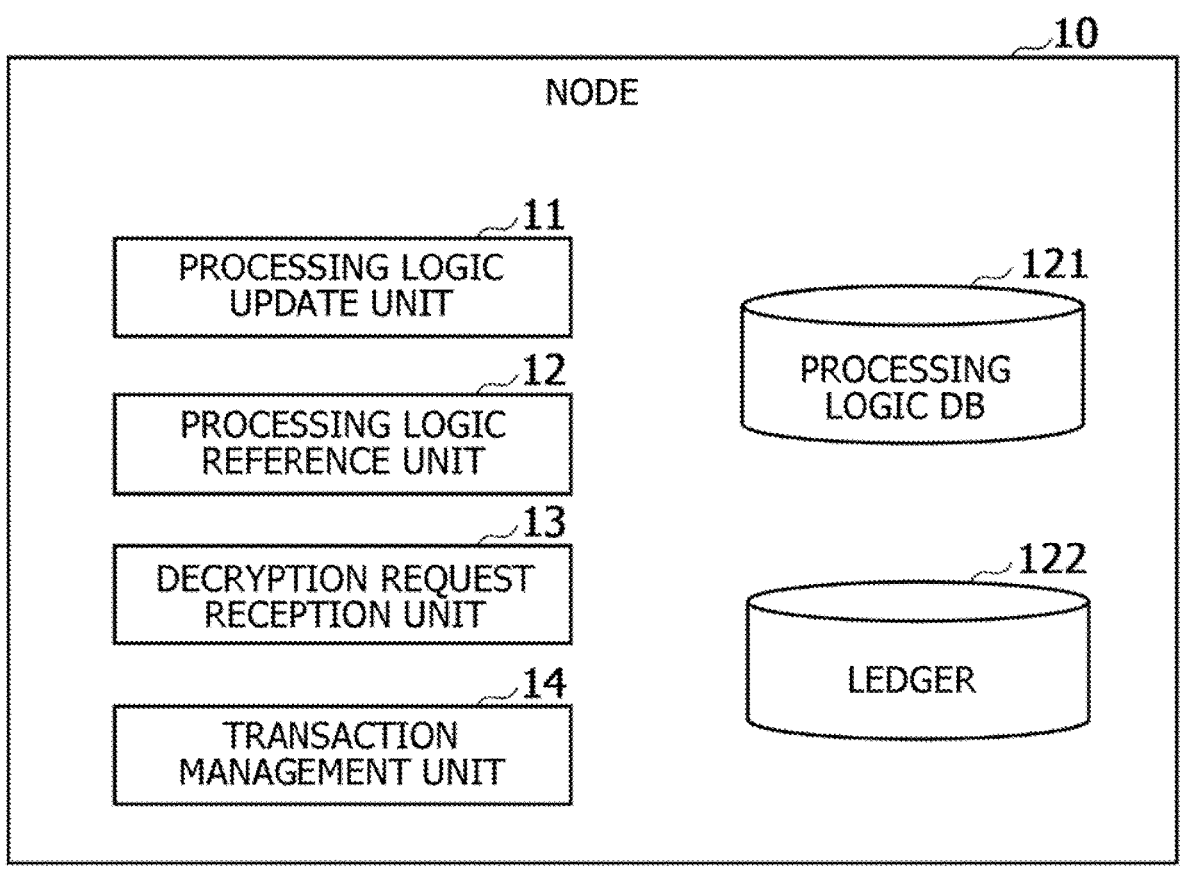
FIG. 3 is a diagram illustrating a functional configuration example of each node 10 of the blockchain C1 in the first embodiment.

FIG. 3 is a diagram illustrating a functional configuration example of each node 10 of the blockchain C1 in the first embodiment. As illustrated in FIG. 3, each node 10 has a processing logic update unit 11, a processing logic reference unit 12, a decryption request reception unit 13, a transaction management unit 14, and the like. Each of these units is implemented by processing that one or more programs installed in each node 10 cause the CPU 104 of the node 10 to execute. For example, each of these parts may be implemented as a smart contract. Each node 10 also uses a processing logic DB 121 and a ledger 122. A storage unit for the processing logic DB 121 and the ledger 122 may be achieved by using, for example, the auxiliary storage device 102 of each node 10, a storage device, or the like, connectable to each node 10 via the network.

The processing logic update unit 11 updates the processing logic DB 121. The processing logic DB 121 stores processing logics.

In response to a reference request for a processing logic, the processing logic reference unit 12 responds with the processing logic corresponding to the reference request among the group of the processing logics stored in the processing logic DB 121.

The decryption request reception unit 13 receives a decryption request of a processing identifier encrypted and added to the processing logic. In the present embodiment, the processing identifier is a character string used to identify the number of times the processing logic has been executed.

In response to a registration request of transaction information to the blockchain C1, the transaction management unit 14 records (registers) the transaction information in the ledger 122. Note that the transaction information is information indicating that the processing logic has been executed, and includes the processing identifier for the processing logic.

Figure 4:
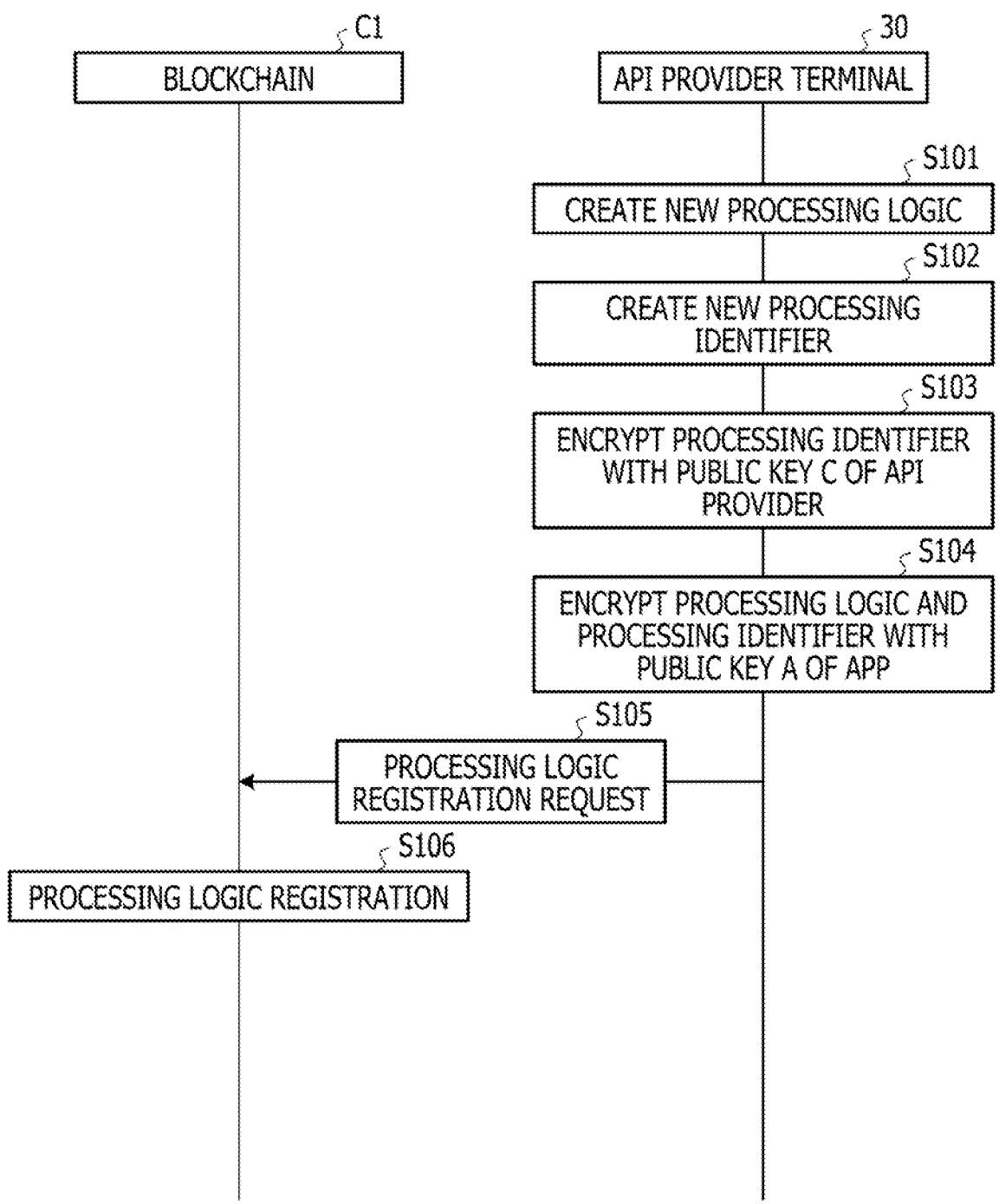
FIG. 4 is a sequence diagram for explaining an example of a processing procedure of processing for registering a processing logic in the blockchain C1.

Hereinafter, a processing procedure executed in the information processing system 1 will be described. FIG. 4 is a sequence diagram for explaining an example of a processing procedure of processing for registering the processing logic in the blockchain C1. Note that in the description of each processing procedure in and after FIG. 4, regarding steps to be executed by the app terminal 20, a program (for example, app a) installed in the app terminal 20 causes the app terminal 20 to execute these steps. On the other hand, regarding steps to be executed by the API provider terminal 30, a program installed in the API provider terminal 30 causes the API provider terminal 30 to execute these steps.

In step S101, the API provider terminal 30 generates a new processing logic in response to an input or the like by a provider of the processing logic. Subsequently, the API provider terminal 30 generates a processing identifier of the processing logic (S102). At this time, the API provider terminal 30 stores the processing logic in the API provider terminal 30 in association with the processing identifier. Next, the API provider terminal 30 encrypts the processing identifier using a public key C of the API provider (S103). Subsequently, the API provider terminal 30, using a public key A of the app a (hereinafter, referred to as "target app") in the app terminal 20, encrypts data (for example, a file) obtained by adding a processing identifier after being encrypted to the processing logic, to thereby generate an encrypted text (S104).

Figure 5:
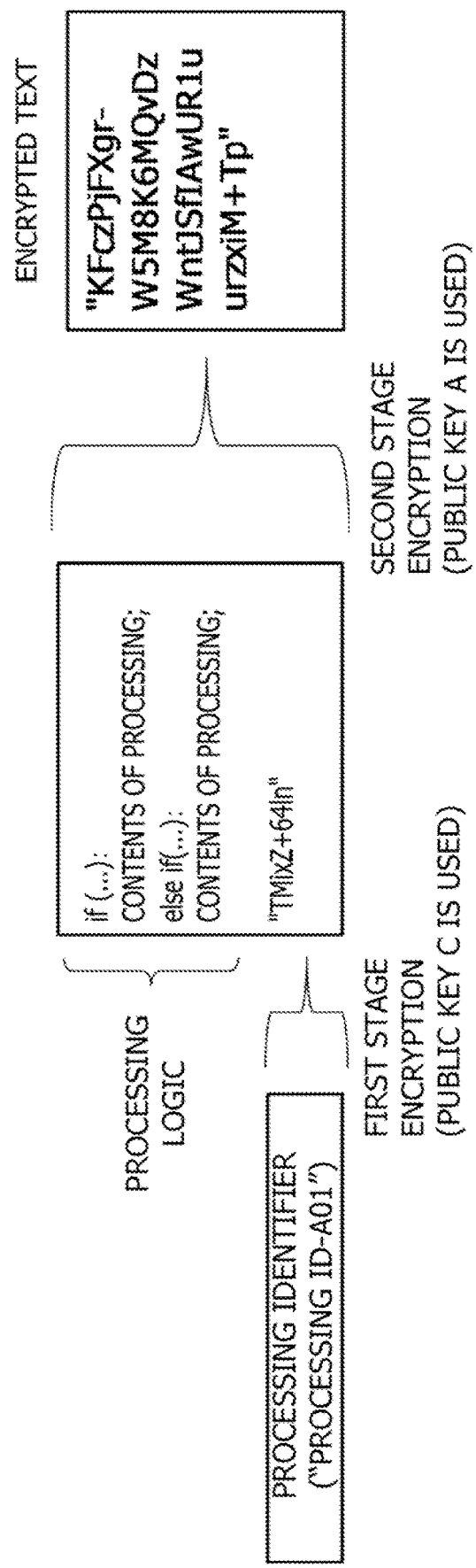
FIG. 5 is a diagram for explaining encryption of the processing logic and a processing identifier.

FIG. 5 is a diagram for explaining encryption of the processing logic and the processing identifier. As illustrated in FIG. 5, first, "processing ID-A01", which is a character string as a processing identifier, is encrypted using the public key C, and an encryption result is given to the processing logic. Moreover, the processing logic including the encryption result is encrypted using the public key A to generate an encrypted text. Note that although FIG. 5 illustrates an example in which the processing logic is a source code (for example, a script or the like), the processing logic may be data in a binary format after being compiled.

Subsequently, the API provider terminal 30 transmits a registration request of the processing logic to the blockchain C1 (S105). The registration request includes an app ID, which is identification information for a combination of a target app and the processing logic, and the encrypted text generated in step S104. In response to the registration request, the processing logic update unit 11 of each node 10 of the blockchain C1 registers the app ID and the encrypted text included in the registration request in association with each other in the processing logic DB 121 of the node 10 (S106).

Figure 6:
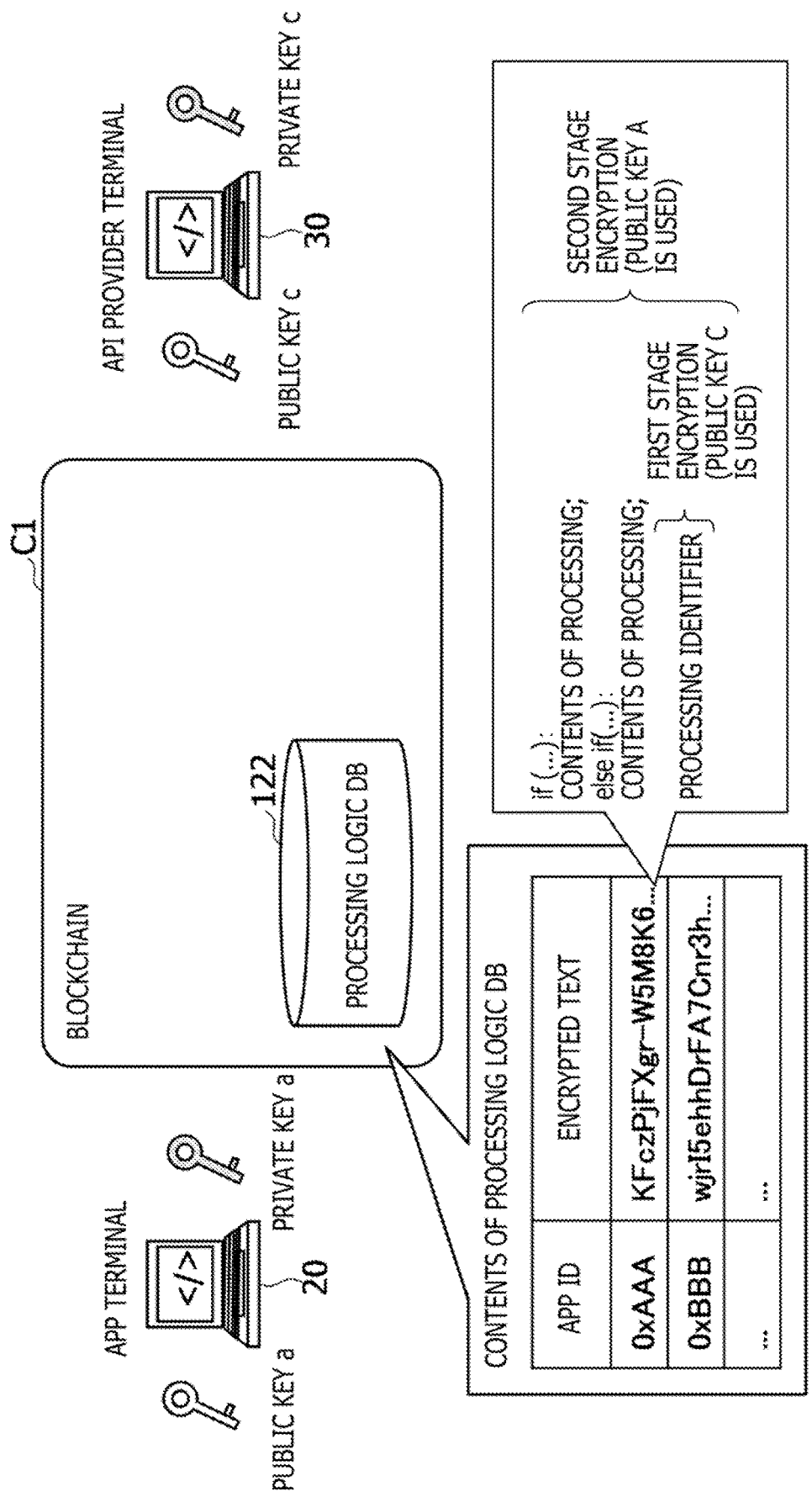
FIG. 6 is a diagram illustrating a configuration example of a processing logic DB 121.

FIG. 6 is a diagram illustrating a configuration example of the processing logic DB 121. As illustrated in FIG. 6, the processing logic DB 121 stores an encrypted text associated with an app ID. The encrypted text is a result from that the processing logic including the processing identifier encrypted using the public key C is encrypted using the public key A. Note that the app ID is different for every app terminal 20. Therefore, with respect to the same app a, the processing procedure of FIG. 4 is executed for every app terminal 20. Note that when a plurality of processing logics is registered for every app, each app ID has a different value.

Figure 7:
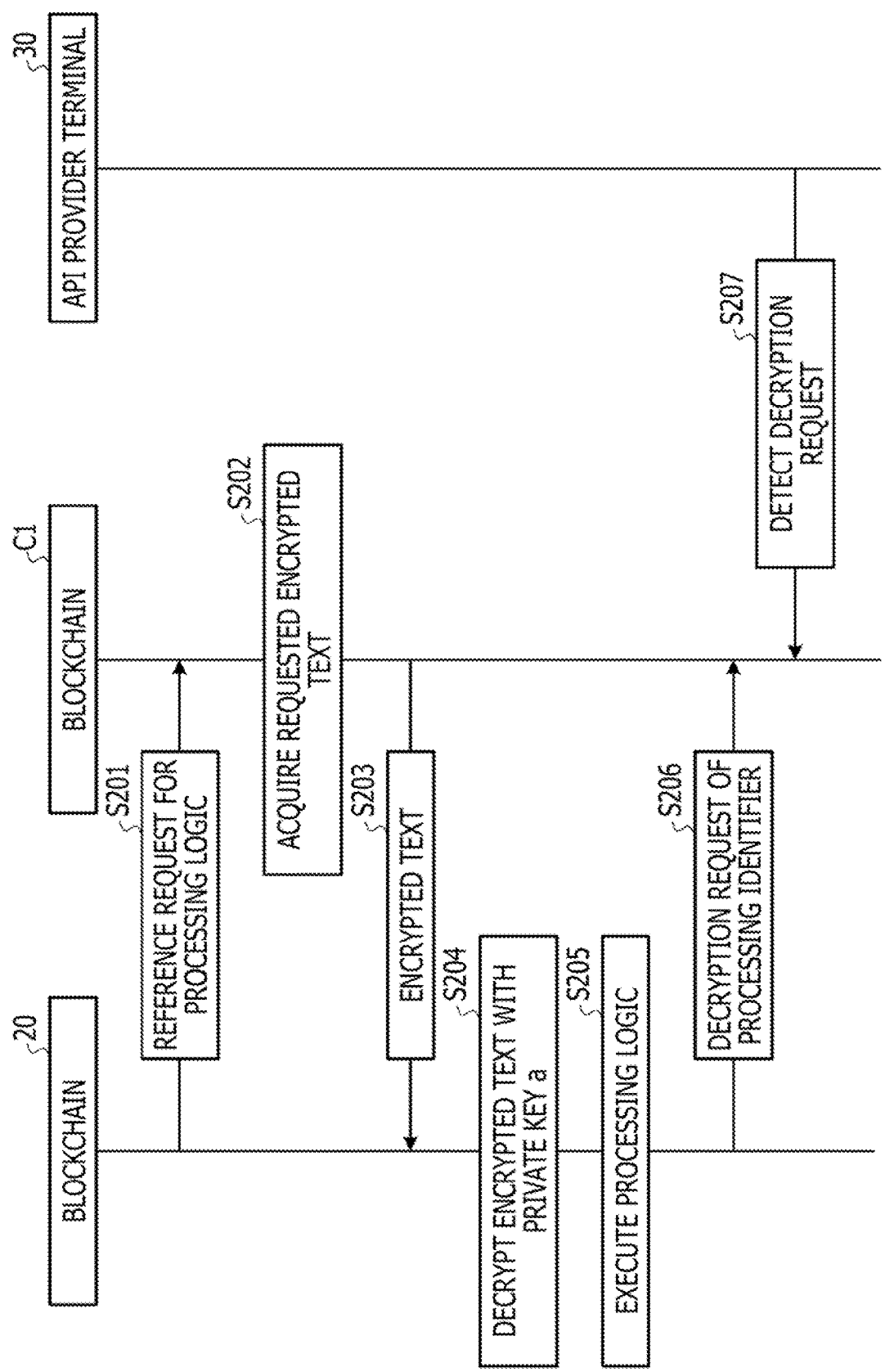
FIG. 7 is a sequence diagram for explaining an example of a processing procedure executed when the processing logic is used.
Figure 8:
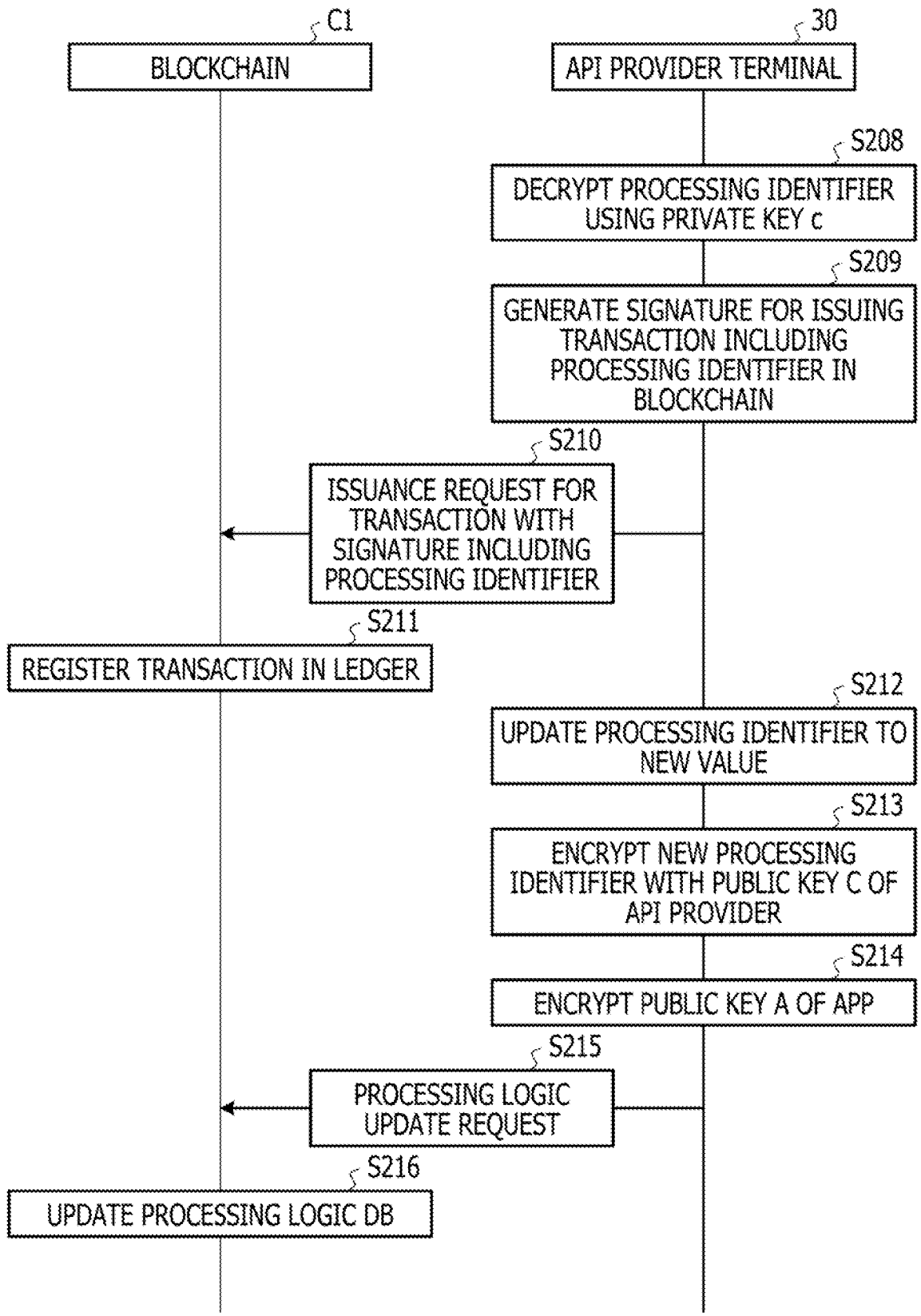
FIG. 8 is a sequence diagram for explaining the example of the processing procedure executed when the processing logic is used.

Subsequently, a processing procedure executed when an app of the app terminal 20 uses the processing logic registered in the processing logic DB 121 will be described. FIGS. 7 and 8 are sequence diagrams for explaining an example of a processing procedure executed when the processing logic is used.

In step S201, the app a of a certain app terminal 20 (hereinafter, referred to as "target app") transmits to the blockchain C1 a reference request for the processing logic in which an app ID corresponding to a processing logic to be used is specified (S201).

When the processing logic reference unit 12 of any node 10 of the blockchain C1 receives the reference request, the processing logic reference unit 12 acquires an encrypted text corresponding to the app ID included in the reference request from the processing logic DB 121 (S202), and transmits a response including the encrypted text to the target app (S203).

Upon receiving the response, the target app decrypts the encrypted text included in the response using a private key a (private key corresponding to the public key A) of the target app (S204). As a result, a processing logic in plain text and an encrypted processing identifier are obtained. Subsequently, the target app causes the app terminal 20 to execute the processing logic in plain text in the API calling portion of the processing logic in the target app (S205). When the execution of the processing logic is completed, the target app transmits to the blockchain C1 a decryption request of the encrypted processing identifier obtained in step S204 (S206). The decryption request includes the encrypted processing identifier. Note that the decryption request substantially has a meaning as a notification that the processing logic has been executed.

The decryption request is received by the decryption request reception unit 13. Upon detecting that the decryption request is received by the decryption request reception unit 13 (S207), the API provider terminal 30 decrypts the processing identifier using a private key c corresponding to the public key C (see S208 of FIG. 8).

Note that the API provider terminal 30 may detect the reception of the decryption request by monitoring the decryption request reception unit 13 (smart contract), or for example, the API provider terminal 30 may detect the reception of the decryption request by periodically performing polling.

Next, the API provider terminal 30 uses the private key c to generate an electronic signature for issuing transaction information including the processing identifier in plain text in the blockchain C1 (S209). Subsequently, the API provider terminal 30 transmits an issuance request for transaction information with the electronic signature, which includes the processing identifier, to the blockchain C1 (S210). The transaction management unit 14 of each node 10 of the blockchain C1 registers the transaction information in the ledger 122 (S211). As a result, the fact that the processing logic identified by the processing identifier (hereinafter, referred to as "target logic") has been executed is registered in the blockchain C1.

Subsequently, the API provider terminal 30 updates the processing identifier (hereinafter, referred to as "old processing identifier") to a different value (hereinafter, referred to as "new processing identifier") (S212). Next, the API provider terminal 30 encrypts the new processing identifier using the public key C of the API provider (S213). Subsequently, the API provider terminal 30, using the public key A of the target app, encrypts the target processing logic to which the processing identifier after being encrypted is added (a file including the processing identifier after being encrypted and the target processing logic), to thereby generate an encrypted text (S214). Note that the API provider terminal 30 stores the target processing logic in association with the old processing identifier. Therefore, the API provider terminal 30 uses the processing logic stored in association with the old processing identifier to generate the encrypted text. Thereafter, the API provider terminal 30 stores the new processing identifier instead of the old processing identifier in the API provider terminal 30 in association with the target processing logic.

Subsequently, the API provider terminal 30 transmits an update request for the target processing logic to the blockchain C1 (S215). The update request includes the app ID, which is identification information for the combination of the target app and the target processing logic, and the encrypted text generated in step S214. In response to the update request, the processing logic update unit 11 of each node 10 of the blockchain C1 updates (replaces) the encrypted text that is stored in the processing logic DB 121 in association with the app ID included in the update request with the encrypted text included in the update request (S216). As a result, the processing identifier stored in the processing logic DB 121 for the target processing logic is updated from the old processing identifier to the new processing identifier.

Figure 9:
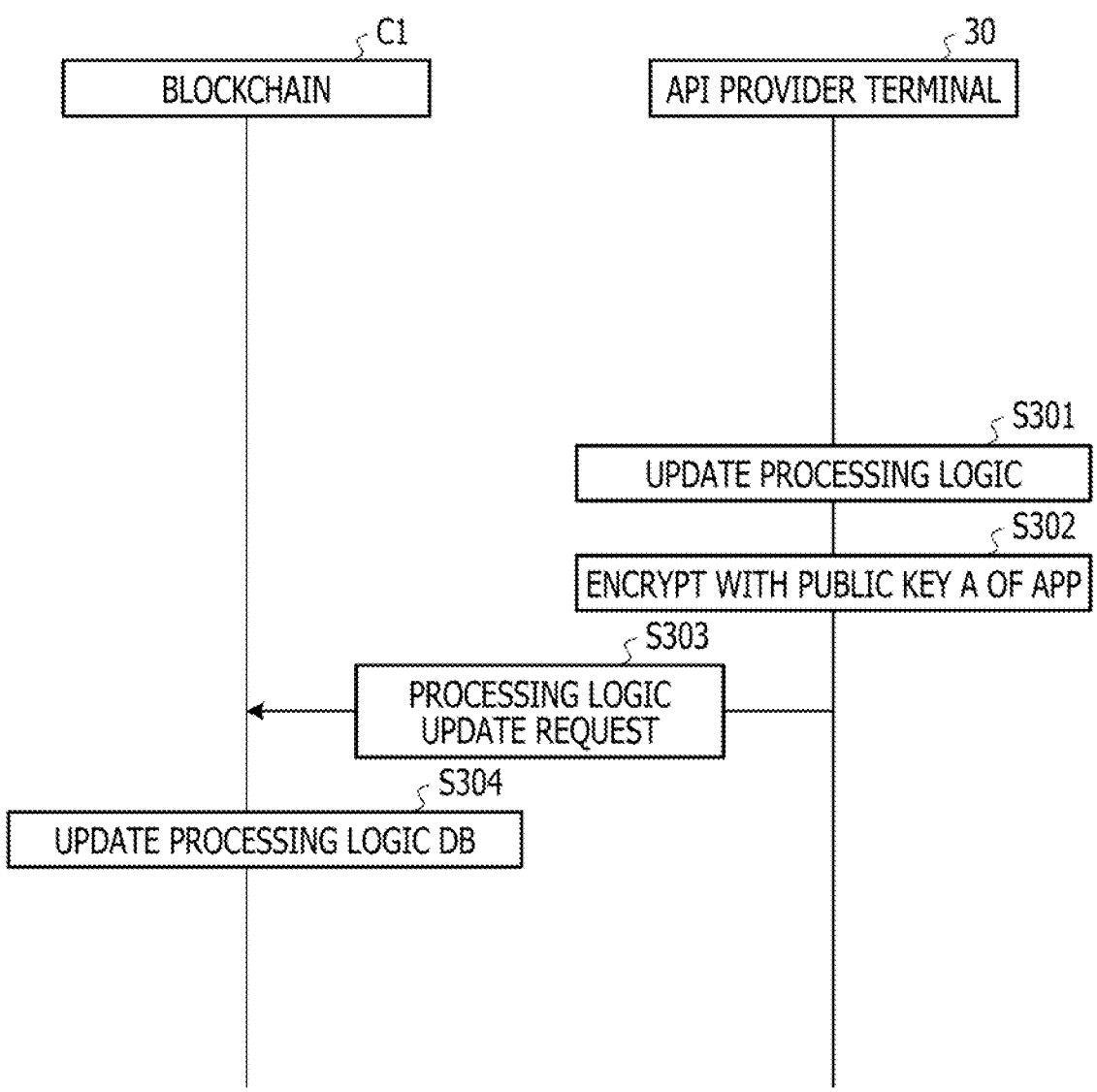
FIG. 9 is a sequence diagram for explaining a first example of a processing procedure of processing for updating the processing logic.

FIG. 9 is a sequence diagram for explaining a first example of a processing procedure of processing for updating the processing logic. The processing procedure of FIG. 9 is a processing procedure executed when the API provider (hereinafter, referred to as "target provider") corrects (updates) the target processing logic.

In step S301, the API provider terminal 30 updates the contents of the target processing logic according to operation by the target provider. Note that in the present embodiment, as illustrated in FIG. 5, it is assumed that the file of the target processing logic contains an encrypted processing identifier. In this case, the processing identifier does not need to be updated. The processing identifier is an identifier for grasping the number of times the target processing logic has been executed, but for example, when performing version management of the target processing logic together, the processing identifier may be updated in step S301. When the processing identifier does not have the role of version management, the processing identifier does not need to be updated in step S301.

Subsequently, the API provider terminal 30, using the public key A of the target app, encrypts the target processing logic to which the encrypted processing identifier is added to thereby generate an encrypted text (S302).

Next, the API provider terminal 30 transmits an update request for the target processing logic to the blockchain C1 (S303). The update request includes the app ID, which is identification information for the combination of the target app and the target processing logic, and the encrypted text generated in step S302. In response to the update request, the processing logic update unit 11 of each node 10 of the blockchain C1 updates (replaces) the encrypted text that is stored in the processing logic DB 121 in association with the app ID included in the update request with the encrypted text included in the request (S304). As a result, the target logic after being updated is stored in the processing logic DB 121. However, in this case, the processing identifier for the target processing logic is not changed.

Figure 10:
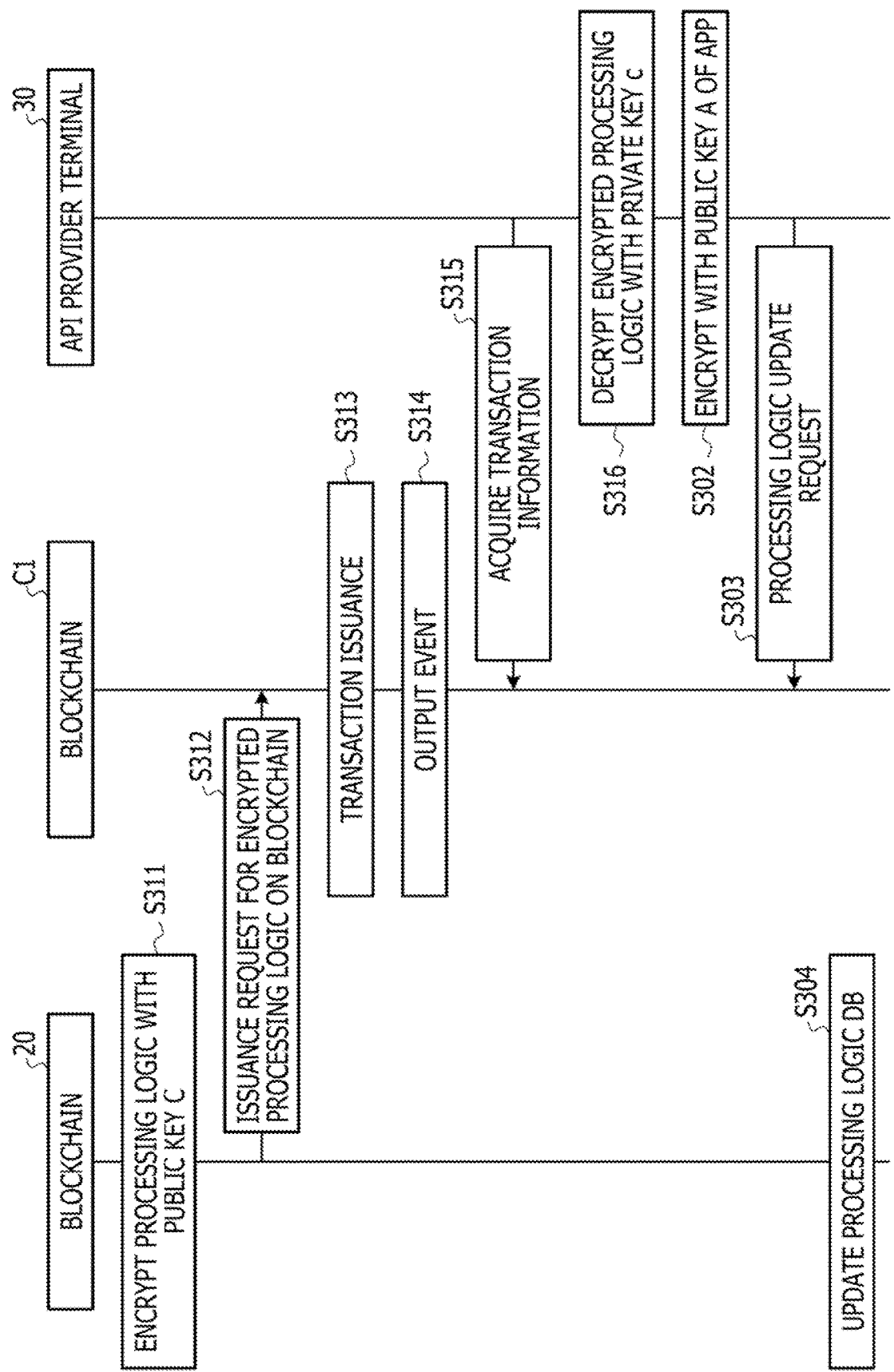
FIG. 10 is a sequence diagram for explaining a second example of a processing procedure of processing for updating the processing logic.

FIG. 10 is a sequence diagram for explaining a second example of a processing procedure of processing for updating the processing logic. The processing procedure of FIG. 10 is a processing procedure executed when the user of the app terminal 20 (hereinafter, referred to as "app user") corrects (updates) the target processing logic. In FIG. 10, the same steps as those in FIG. 9 are designated by the same step numbers, and the description thereof will be omitted.

In step S311, the app terminal 20 encrypts the data including the target processing logic corrected (updated) by the app user and the encrypted processing identifier given to the processing logic before being corrected, with the public key C of the API provider terminal 30. Hereinafter, the encrypted text generated by being encrypted will be referred to as "update processing logic". Subsequently, the app terminal 20 transmits to the blockchain C1 an issuance request for the update processing logic on the blockchain C1 (S312). The issuance request includes the update processing logic.

The transaction management unit 14 of the blockchain C1 issues transaction information indicating an update of the target processing logic in response to the issuance request (S313). As a result, the transaction information is recorded in the ledger 122. The transaction information includes the update processing logic. Subsequently, the transaction management unit 14 outputs (fires) an event indicating that the target processing logic has been updated (S314).

Upon detecting the event, the API provider terminal 30 acquires the transaction information from the blockchain C1 (S315). Subsequently, the API provider terminal 30 decrypts the update processing logic included in the transaction information using the private key c (S316). As a result, a processing logic in plain text (processing logic after being corrected) to which a processing identifier encrypted using the public key C is added is obtained.

Step S302 and subsequent steps are executed on the processing logic as a processing target. As a result, a correction result of the processing logic in the app terminal 20 is reflected in the processing logic DB 121.

As described above, according to the first embodiment, the transaction information including the processing identifier that is the identifier corresponding to the processing logic is recorded in the blockchain C1, according to execution of the processing logic. Therefore, the number of times the processing logic is executed may be grasped based on the processing identifier recorded in the blockchain C1. As a result, it is possible to perform charging according to the number of times the program related to the processing logic is executed.

Further, in the present embodiment, once the transaction information including the processing identifier of the processing logic is recorded in the blockchain C1 according to execution of the processing logic, the processing identifier of the processing logic is updated to a different value. Thus, a different processing identifier is recorded in the blockchain C1 every time the same processing logic is executed. As a result, it is possible to provide deterrence against unauthorized reuse of the same processing logic by the application side. For example, in the app terminal 20, since the processing logic in plain text may be acquired in step S204 of FIG. 7, this processing logic may be executed without executing steps S201 to S203 from the next time and thereafter. In this case, in step S206, the same processing identifier as the last time is transmitted. Therefore, by this transmission, it is possible to detect unauthorized use of the processing logic.

Note that it is also conceivable that the app terminal 20 does not execute step S206. Therefore, operation may be performed such that execution of the processing logic for which the transaction information including the processing identifier is not recorded in the blockchain C1 is not supported. Not supported means that, for example, even if a processing logic contains a bug and an illegal operation occurs with respect to the processing logic, the API provider does not respond to the illegal operation.

Next, a second embodiment will be described. In the second embodiment, different points from the first embodiment will be described. In the second embodiment, points that are not particularly mentioned may be similar to those in the first embodiment.

FIG. 11 is a diagram illustrating a configuration example of an information processing system according to the second embodiment. In FIG. 11, the app terminal 20 is connected to the blockchain C1 via a blockchain C2. In this case, in each processing procedure in the first embodiment, interaction between the app terminal 20 and the blockchain C1 is relayed by the blockchain C2. With such a configuration, for example, if transaction information is not recorded in the blockchain C1, the smart contract of the blockchain C2 inquires from the node of the blockchain C2 to the node of the blockchain C1 by a method such as via direct communication, via application, or via blockchain receives a response that the transaction information is not recorded on the blockchain C1, and rejects the request from the app terminal 20 based on a response result, and thereby it is possible to suppress use of an illegal processing logic.

Note that in each of the embodiments described above, the node 10 is an example of an information processing device. The processing identifier is an example of a first identifier and a second identifier. The processing logic reference unit 12 is an example of a transmission unit. The transaction management unit 14 is an example of a registration unit. The processing logic update unit 11 is an example of an update unit. The public key A and the private key a are examples of a first public key and a first private key, respectively. The public key C and the private key c are examples of a second public key and a second private key, respectively.

Although the first and second embodiments have been described in detail above, the embodiments are not limited thereto, and various modifications and alternations may be made within the scope of the gist of the embodiments described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
transmit, to a terminal, a program and a first identifier related to the program, the program being encrypted with a first public key corresponding to a first private key of the terminal, the first identifier being encrypted by using the first public key and a second public key not corresponding to the first private key; and when the terminal receives the first identifier decrypted by the first private key and encrypted by the second public key, register, in a blockchain, transaction information which includes the first identifier decrypted with the second private key corresponding to the second public key, wherein processor is configured to when the transaction information is registered in the blockchain, update the first identifier stored in a storage unit with a second identifier different from the first identifier, the second identifier being encrypted with the second public key and then encrypted with the first public key.

2. The information processing device according to claim 1, wherein the processor is configured to store, in the memory, information in which the encrypted program and the encrypted first identifier are associated with each other.

3. An information processing method executed by a computer, the information processing method comprising:

transmitting, to a terminal, a program and a first identifier related to the program, the program being encrypted with a first public key corresponding to a first private key of the terminal, the first identifier being encrypted by using the first public key and a second public key not corresponding to the first private key; and when the terminal receives the first identifier decrypted by the first private key and encrypted by the second public key, registering, in a blockchain, transaction information which includes the first identifier decrypted with the second private key corresponding to the second public key, wherein the information processing method comprising when the transaction information is registered in the blockchain, updating the first identifier stored in a storage unit with a second identifier different from the first identifier, the second identifier being encrypted with the second public key and then encrypted with the first public key.

4. The information processing method according to claim 3, wherein the information processing method comprising store, in a memory, information in which the encrypted program and the encrypted first identifier are associated with each other.

5. A non-transitory computer-readable storage medium storing a program that causes a computer to execute a process, the process comprising:

transmitting, to a terminal, a program and a first identifier related to the program, the program being encrypted with a first public key corresponding to a first private key of the terminal, the first identifier being encrypted by using the first public key and a second public key not corresponding to the first private key; and when the terminal receives the first identifier decrypted by the first private key and encrypted by the second public key, registering, in a blockchain, transaction information which includes the first identifier decrypted with the second private key corresponding to the second public key, wherein the process comprising when the transaction information is registered in the blockchain, updating the first identifier stored in a storage unit with a second identifier different from the first identifier, the second identifier being encrypted with the second public key and then encrypted with the first public key.

6. The non-transitory computer-readable storage medium according to claim 5, wherein the process comprising store, in a memory, information in which the encrypted program and the encrypted first identifier are associated with each other.

* * * * *